United States Patent [19]

D'Andrea et al.

[11] Patent Number: 4,709,455
[45] Date of Patent: Dec. 1, 1987

[54] MILLING AND DRILLING HEAD FOR A MACHINE TOOL

[75] Inventors: Ermanno D'Andrea; Nicola D'Andrea, both of Lainate, Italy

[73] Assignee: D'Andrea S.p.A., Lainate, Italy

[21] Appl. No.: 787,307

[22] Filed: Oct. 15, 1985

[51] Int. Cl.[4] .......................... B23B 43/00; B23C 3/34
[52] U.S. Cl. ......................................... 29/40; 29/26 A; 29/39; 409/144; 409/199; 409/201; 409/215; 409/216; 409/217; 409/230
[58] Field of Search .................... 29/40, 568, 35.5, 39, 29/26 A; 408/31, 35, 47; 409/144, 204, 215, 216, 217, 230, 183, 199, 201, 241

[56] References Cited

U.S. PATENT DOCUMENTS

| | | | |
|---|---|---|---|
| 3,115,051 | 12/1963 | Burg | 408/35 |
| 3,735,459 | 5/1973 | Allen | 408/35 |
| 3,757,637 | 9/1973 | Eich et al. | 409/230 |
| 4,087,890 | 5/1978 | Ishizuka et al. | 29/40 |
| 4,245,939 | 1/1981 | Lear | 409/199 |
| 4,417,379 | 11/1983 | Goode | 29/35.5 |
| 4,489,629 | 12/1984 | D'Andrea | 29/568 |

FOREIGN PATENT DOCUMENTS

| | | | |
|---|---|---|---|
| 1022076 | 1/1958 | Fed. Rep. of Germany | 29/40 |
| 494122 | 4/1919 | France | 29/40 |
| 949516 | 9/1949 | France | 408/35 |

Primary Examiner—Gil Weidenfeld
Assistant Examiner—Daniel W. Howell
Attorney, Agent, or Firm—Romney, Golant, Martin, Seldon & Ashen

[57] ABSTRACT

A milling and drilling head for a machine tool has an input shaft housed in a stationary case also incorporating a control means drivingly connected to a ring gear which is fast with a moving case portion accommodating at least one tool holding spindle driven off the master spindle of the machine tool and being set at an angle to the X-axis thereof.

8 Claims, 3 Drawing Figures

MILLING AND DRILLING HEAD FOR A MACHINE TOOL

BACKGROUND OF THE INVENTION

This invention relates to a milling and drilling head for a machine tool, and in particular for milling machines or NC machining centers incorporating magazines adapted to receive the individual tool bits.

On such machines, the tool holding spindle is generally controlled by a numerical control unit, and according to the types of work to be executed, tool bits aree picked up by means of a specially provided device, known per se, from a magazine as required for a specific cutting operation.

A distinct advantage of these modern machine tools is that the workpiece, once clamped to the table, may be subjected to multiple machining steps to be carried out automatically and by using a range of different tools, always under direct control by the NC unit and without intervention by the machine operator.

While the above-described machines, most of the cutting operations can be performed successfully using a single clamping of the workpiece to the table, it has not been possible, heretofore, to perform on these machines, with the aid of traditional tools, any operations under control by the NC unit which involved, for example, changes in the angle of the tool being employed relatively to the main spindle X-axis.

However, machining operations of this kind are a fairly frequent occurrence, e.g. to form holes and/or threads at different angular settings in cylindrical bodies coaxially with the spindle X-axis, or circumferential grooves in the outer or inner surfaces of cylindrical bodies, or S-like pattern grooves for the lubrication of rotary shafts, and the like. It has been necessary in the past to carry out such operations on some other cutting machines to complete the workpiece machining; which reflected in inferior machining precision and increased manufacturing costs, resulting in part from the need for special machine tools, often requiring the availability of some special tools and jigs, the high cost whereof is well recognized in the art.

SUMMARY OF THE INVENTION

It is an object of this invention to provide a novel milling head for use on an NC machine tool, which incorporates a tool bit magazine and is adapted to perform the operations discussed in the preamble without resorting to any special tools, and above all, on the same machine which also carries out the traditional machining steps.

This object is achieved according to the invention by that a first half of the head case has an input shaft for coupling to a machine tool spindle, that the end of the input shaft extends through a second half of the head case, arranged to be rotatable relatively to the stationary first half of the head case, that said input shaft is drivingly connected through bevel gears to one or more tool holding spindles carried on the moving second case half at an angle to the X-axis of the machine tool or master spindle, and that said moving case half is rigid with a ring gear drivingly connected, through an intermediate shaft, to a control shaft operated, via intervening control and drive means, by the NC unit of said machine tool.

Further advantages of the invention may be appreciated from the ensuing description, the subclaims, and accompanying drawings.

BRIEF DESCRIPTION OF THE DRAWINGS

The subject invention will be now described more in detail with reference to a purely examplary embodiment thereof, as illustrated in the accompanying drawings, where.

DESCRIPTION OF THE PREFERRED EMBODIMENT

Figure 1:
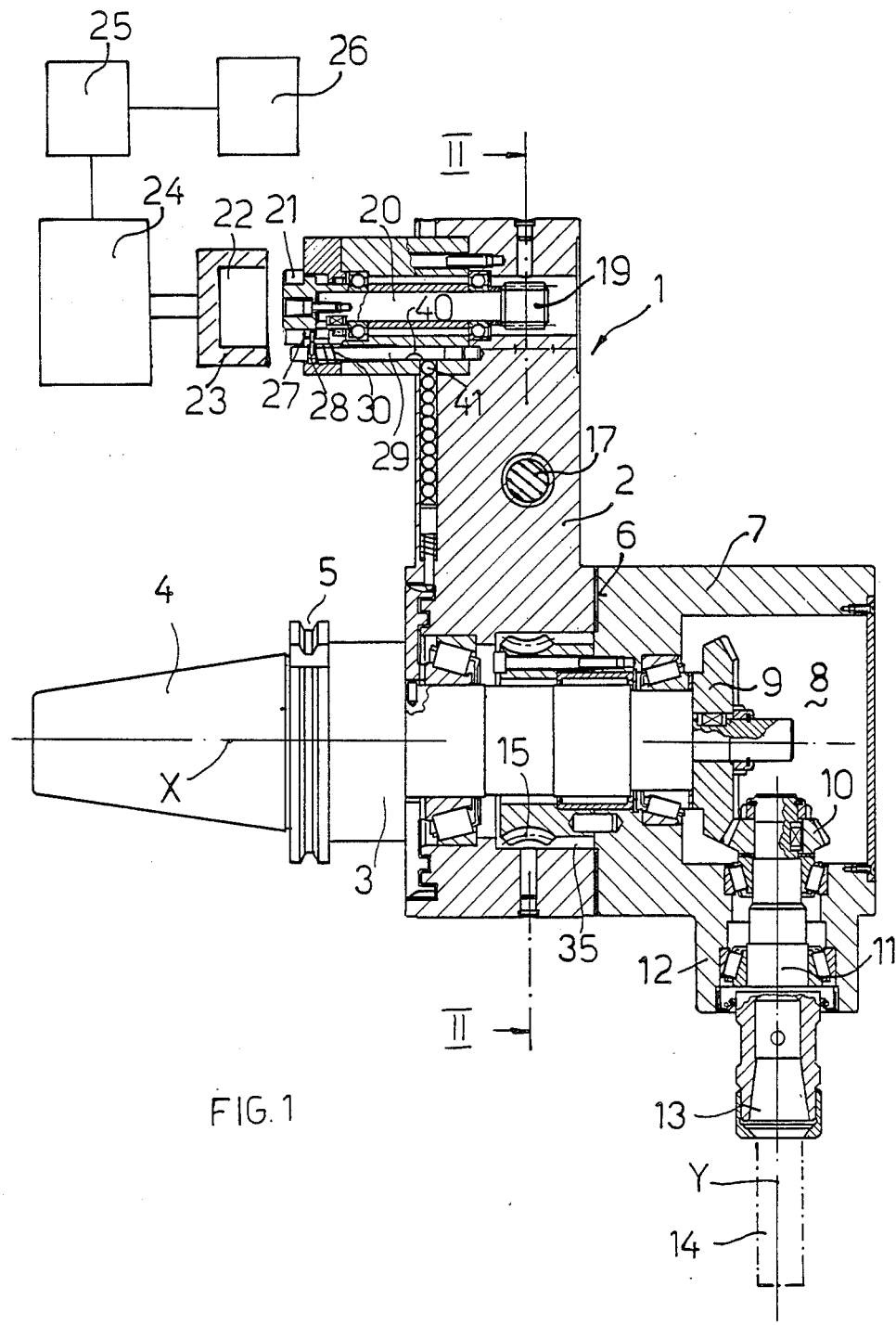
FIG. 1 is a cross-sectional view of this milling head.

As shown best in FIG. 1 of the drawings, this milling head, generally indicated at 1, comprises a first case half or portion 2 which is held stationary and carries an input shaft 3 through conventional bearings. Said input shaft 3 is terminated at one end with a conventional taper 4 which, with the assistance of known tool change devices engaging, for example, with a collar 5 thereon, can be inserted and locked in the tapered socket of the master spindle (not shown) of a machine tool.

With the interposition of a fretting layer 6 formed, for example, from a fretting resistant material such as the one available commercially under the trade name "Turcite", a second case half or portion 7 is connected operatively to the stationary case portion 2 which is rotatable about the axis of the shaft 3. The remote end of the input shaft 3 from the taper 4 extends into a chamber 8 of the rotatable case portion 7, wherein the end of the shaft 3 is attached to a bevel gear 9 meshing, in this specific instance, with a bevel gear 10 fast with a spindle 11 which is carried, through conventional bearings, in a radial boss portion 12 of the rotatable case portion 7.

In FIG. 1, the Y-axis of the spindle 11 extends perpendicularly to the X-axis of the input shaft 3, although other angular settings are also viable. The spindle 11 has on its forward end a tapered socket 13 adapted to receive a tool bit 14, such as a cylindrical cutter.

Figure 2:
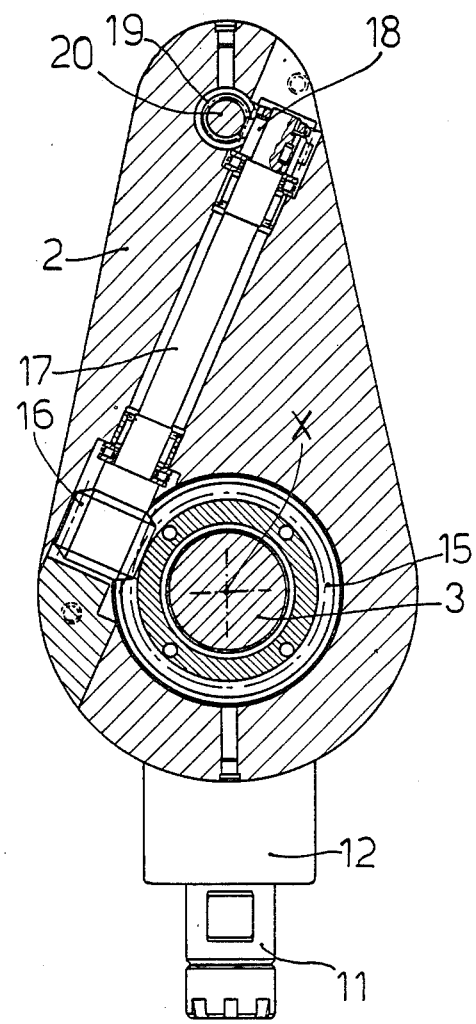
FIG. 2 is a sectional view of this milling head, taken along the line II—II in FIG. 1.
Figure 3:
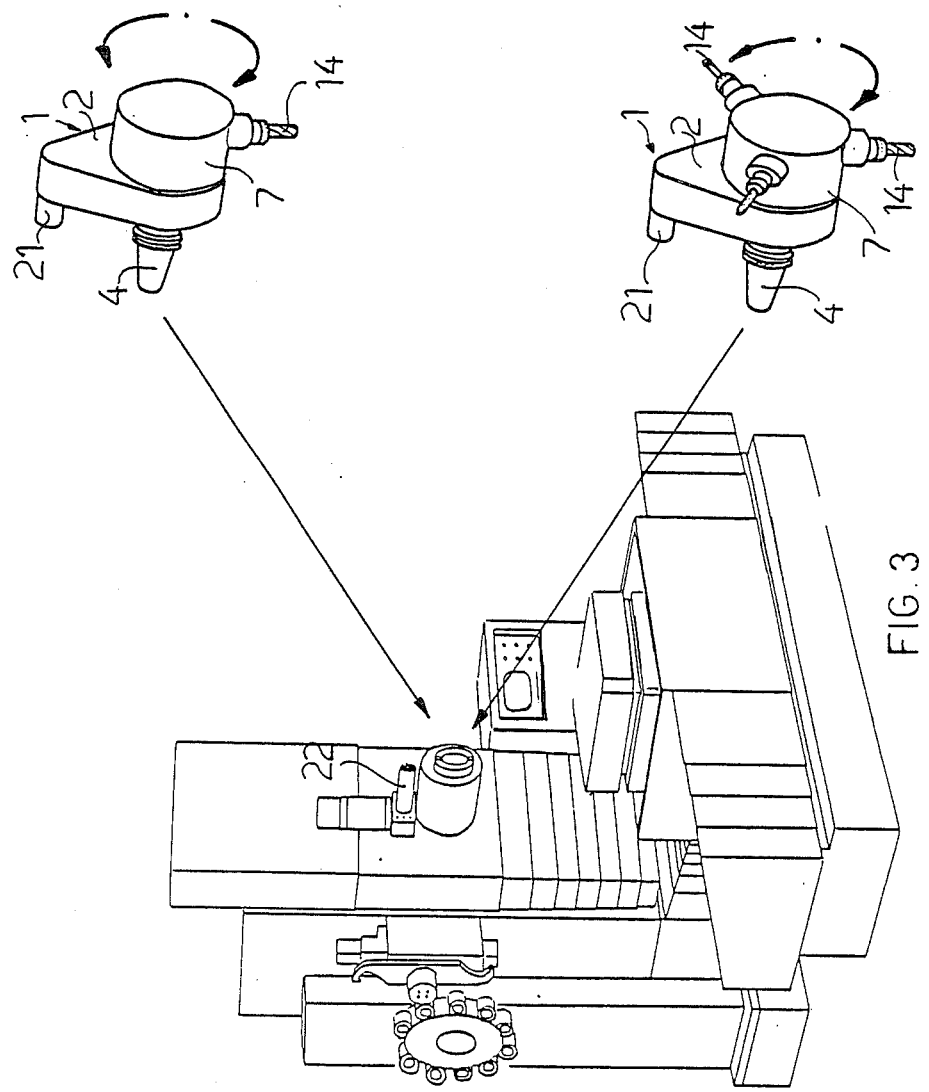
FIG. 3 shows schematically two embodiments of this head and a machine tool adapted to receive them.

For clarity of illustration, a single spindle 11 is shown in FIGS. 1 and 2, but of course, the rotatable or moving portion 7 of the head case may be provided with a number of radial bosses 12 distributed circumferentially therearound and offset angularly with respect to the X-axis so as to provide several spindles 11 holding such different tool bits as center bits, drill bits, countersinking tools, and tapping tools.

Thus, as an example, heads holding two tool bits may be envisaged; in that case, the spindles 11 would be offset angularly by 180° or three, and even four, spindles 11 may be provided at mutual angular settings of 120°, respectively 90°. A ring gear 15 is made rigid with the moving portion 7 of the case which is housed within a chamber 35 in the stationary portion 2 of the head case.

Said ring gear 15 is mounted to be freely rotatable about the input shaft 3 and is connected drivingly to a worm 16 (FIG. 2) attached to a shaft 17 extending across the stationary case portion 2 to engage at its other end and through a gear 18 (FIG. 2) with a worm 19 made fast with a control shaft 20, which is laid parallel to the shaft 3 and has a profile-cut head 21 fitting in a socket 22 of mating configuration in a spindle 23 housed within the machine tool structure (not shown)

and being rigid with a drive motor 24, which motor can be activated and controlled, with the interposition of such conventional means as an encoder and/or resolver 25, by the NC central unit 26 of the machine tool. Control arrangements of this general kind are disclosed in European Pat. No. 81110270.6 by this same Applicant, wherein they are applied, however, to a boring and facing head.

In order to ensure that the profile-cut head 21 of the control shaft 20 is at all times engaged to provide secure coupling to the socket 22 in the spindle 23, said small profile-cut head 21 is advantageously formed with a small lengthwise spine 27 effective to be engaged by retaining rod 28 which is fast with a pin 29 displaceable against the bias of a spring 30 during the coupling movement toward the spindle 23 and having a locating notch 40 which is engaged by a small spring-loaded ball 41.

The operation of the head 1 herein will be now described.

As a tool bit 14 is picked up from the machine magazine and as the taper 4 of the input shaft 3 is fitted into the tapered socket in the machine tool spindle or master spindle, the profile-cut head 21 of the shaft 20 is simultaneously coupled with the spindle 23. Then, a rotary motion is transmitted through the shaft 3 to the spindle, or spindles, 11 and, accordingly, to the corresponding tool bits 14.

To position the tool bit 14 angularly about the X-axis, it will be sufficient to impart, through the controllable motor 24, a rotary movement to the spindle 23, and hence, the shaft 20, which will drive rotatively the moving case portion 17 via the worm 19, gear wheel 18, intermediate shaft 1, worm 16, and ring gear 15.

Thus, the tool bits 14 can be imparted a controlled rotary movement about the X-axis of the input shaft 3, or the tool bit 14 can be accurately positioned angularly about said X-axis, which positioning is effected by means of the motor 24 and monitored by conventional sensing means 25 operatively connected to the NC unit 26.

The drilling and milling head of this invention affords the advantage that with a numerical control milling machine having a magazine for a number of tool bits, it becomes for the first time possible to execute, with a single clamping of the workpiece, machining operations which required in the past the use of an additional machine tool, and consequently, re-clamping of the workpiece.

In particular, this invention enables machining at different angles or at angles which vary continuously, such as drilling boring, and inside and outside threading on cylindrical bodies, as well as grooving the inside or outside of such bodies, e.g. forming complete or partial circumferential grooves, undercuts, lubrication grooves, etc. thereeon.

We claim:

1. A milling and drilling head, in combination with a machine tool that has a master spindle, a control spindle and a numerical-control unit; said head comprising:
   a stationary case portion;
   an input shaft rotatably mounted to the stationary case portion and adapted for coupling with the master spindle of the machine tool to receive mechanical rotation therefrom;
   a movable case portion mounted to the stationary case portion for substatially continuous rotation;
   at least one bit-holding spindle rotatably mounted to the movable case portion for rotation at an angle to the rotation of the input shaft so that the bit-holding spindle is substantially continuously adjustable in disposition relative to the input shaft;
   first rotation-transmitting means interconnecting the input shaft and the at least one bit-holding spindle, to transmit rotation from the input shaft through said angle to the bit-holding spindle;
   a control shaft rotatably mounted to the stationary case portion, and adapted for coupling to the control spindle of the machine tool to receive substantially continuous adjustment rotationally therefrom;
   second rotation-transmitting means interconnecting the control shaft and the movable case portion, to transmit substantially continuous adjustment from the control shaft to the movable case portion rotationally, to substantially continuously adjust the disposition of the bit-holding spindle relative to the input shaft;
   the numerical-control unit of the machine tool, in use, controlling the master-spindle rotation to supply cutting rotation to the bit-holding spindle and simultaneously controlling the control-spindle rotation to substantially continuously adjust the disposition of the bit-holding spindle during cutting;
   whereby the machining tool and said head in combination provide machine at angles which vary continuously, including formation of compound shapes in curved surfaces.

2. The milling and drilling head of claim 1, in combination with such a machine tool that has a tool-bit magazine from which any of a plurality of cutting bits is automatically selected; and wherein:
   the input shaft comprises a conical structure that aids in guiding the input shaft into coupling with the master spindle;
   the numerical-control unit, in use, controlling automatic selection of said milling and drilling head as a unit from the tool-bit magazine and automatic coupling of the input shaft of said milling and drilling head with the master spindle.

3. The milling and drilling head of claim 1, wherein:
   the first rotation-transmitting means comprises a first gear that is mounted for rotation with the input shaft and a second gear that is mounted for rotation with the bit-holding spindle;
   the first and second gears being mutually intermeshed to transmit rotation from the input shaft to the bit-holding spindle.

4. The milling and drilling head of claim 3, wherein: the gears are bevel gears.

5. The milling and drilling head of claim 4, wherein: said at least one bit-holding spindle comprises a plurality of bit-holding spindles that are mutually offset circumferentially about the movable case portion.

6. The milling and drilling head of claim 1, wherein the second rotating-transmitting means comprise:
   a worm mounted for rotation with the control spindle;
   a control shaft rotatably mounted to the stationary case portion;
   a worm gear mounted for rotation with the control shaft, and engaged with and driven by the first worm:
   a second worm mounted for rotation with the control shaft; and a ring gear mounted for rotation with the movable case portion, and engaged with and driven by the second worm.

7. A method of performing machining operations, comprising:

providing a machine tool that has a master spindle, a control spindle and a numerical control unit;

providing a milling and drilling head, for use with the machine tool, that comprises:

a stationary case portion;

an input shaft rotatably mounted to the statitonary case portion and adapted for coupling with the master spindle of the machine tool to receive mechanical rotation therefrom;

a movable case portion mounted to the stationary case portion for substantially continuous rotation;

at least one bit-holding spindle rotatably mounted to the movable case portion for rotation of the bit-holding spindle at an angle to the rotation of the input shaft so that the bit-holding spindle is substantially continuously adjustable in disposition relative to the input shaft;

first rotation-transmitting means interconnecting the input shaft and the at least one bit-holding spindle, to transmit rotation from the input shaft through said angle to the bit-holding spindle;

a control shaft rotatably mounted to the stationary case portion, and adapted for coupling to the control spindle of the machine tool to receive substantially continuous adjustment rotationally therefrom;

second rotation-transmitting means interconnecting the control shaft and the movable case portion, to transmit substantially continuous adjustment from the control shaft to the movable case portion rotationally, to substantially continuously adjust the disposition of the bit-holding spindle relative to the input shaft;

then automatically, through the numerical-control unit of the machine tool, controlling the master-spindle rotation to supply cutting rotation to the bit-holding spindle; and simultaneously with the last-mentioned step, controlling the control-spindle rotation to substantially continuously adjust the disposition of the bit-holding spindle during cutting;

thereby providing machining at angles which vary continuously, including formation of compound shapes in curved surfaces.

8. The method of claim 7:

wherein the machine-tool providing step comprises providing a machine tool that also has a tool-bit magazine from which any of a plurality of cutting bits is automatically selected;

wherein the milling-and-drilling-head providing step comprises providing a milling and drilling head whose input shaft comprises a conical structure that aids in guiding the input shaft into coupling with the master spindle; and also comprising the step of automatically, through the numerical-control unit, controlling selection of said milling and drilling head as a unit from such tool-bit magazine and controlling coupling of the input shaft of said milling and drilling head with such master spindle.

* * * * *